United States Patent [19]
Miyaki et al.

[11] 3,884,197
[45] May 20, 1975

[54] INTERNAL COMBUSTION ENGINE

[75] Inventors: Kiyoshi Miyaki, Asaka; Akira Okubo; Sakuji Arai, both of Tokyo, all of Japan

[73] Assignee: Honda Giken Kogyo Kabushiki Kaisha, Tokyo, Japan

[22] Filed: July 2, 1973

[21] Appl. No.: 375,497

[30] Foreign Application Priority Data
July 5, 1972   Japan................................ 47-67262

[52] U.S. Cl........... 123/75 B; 123/32 K; 123/32 SP; 123/32 ST; 123/191 S
[51] Int. Cl............................................ F02b 19/10
[58] Field of Search............ 123/32 C, 32 D, 32 ST, 123/32 SP, 32 SA, 75 B, 32 SJ, 191 S, 191 SP, 32 K

[56] References Cited
UNITED STATES PATENTS

| | | | |
|---|---|---|---|
| 2,121,920 | 6/1938 | Mallory...................... | 123/191 SP X |
| 2,184,357 | 12/1939 | Mallory......................... | 123/75 B X |
| 3,066,661 | 12/1962 | May .............................. | 123/75 B X |
| 3,124,113 | 3/1964 | May et al. ......................... | 123/75 B |
| 3,255,739 | 6/1966 | Von Seggern et al........... | 123/32 ST |

OTHER PUBLICATIONS
"Project Stratofire," by Keith H. Rhodes, SAE Paper No. 660094, Automotive Engr. Congress, Detroit, Mich., Jan. 10–14, 1966, Note page 2, column 2, lines 24–26, and page 7, Figure 16.

Primary Examiner—Charles J. Myhre
Assistant Examiner—Tony Argenbright
Attorney, Agent, or Firm—Lyon & Lyon

[57] ABSTRACT

An internal combustion engine of the type having a relatively large main combustion chamber supplied with a lean mixture through a main inlet passage and a relatively small auxiliary combustion chamber supplied with a rich mixture through an auxiliary inlet passage, the auxiliary combustion chamber being in communication with the main combustion chamber through a torch nozzle. Means are provided for igniting the rich mixture to cause a flame to project through the torch nozzle to burn the lean mixture in the main combustion chamber. The main and auxiliary passages are throttled are supplied respectively through a relatively large main venturi passage and a relatively small auxiliary venturi passage, and wherein the effective area of the torch nozzle is greater than that of the auxiliary venturi passage.

4 Claims, 1 Drawing Figure

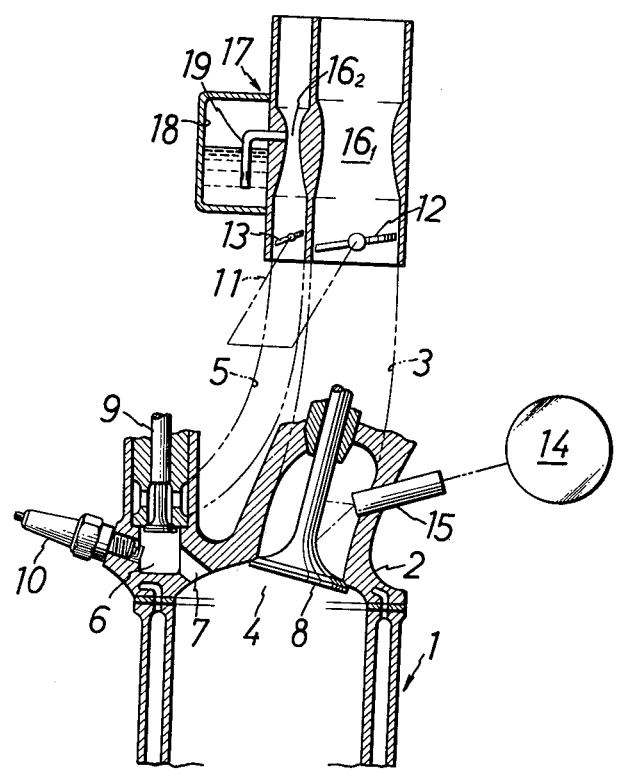

INTERNAL COMBUSTION ENGINE

BACKGROUND AND SUMMARY OF THE INVENTION

It is desirable in internal combustion engines of the type having a relatively large main combustion chamber which receives a lean mixture and a relatively small auxiliary combustion chamber which receives a rich mixture, for ignition and projection of a flame into the main combustion chamber through a torch nozzle, that the relative proportions of the lean and rich mixtures be maintained so that the resultant overall air-fuel ratio be leaner than the theoretical ratio so as to control the generation of harmful ingredients such as nitrogen oxides, carbon monoxide and other harmful components in the exhaust gasses discharged from the main combustion chamber.

The interior surfaces of the torch nozzle tend to accumulate unwanted deposits which are the product of combustion, and therefore the effective cross section area of the torch nozzle may be restricted by such unwanted deposits.

An object of the present invention is to provide an internal combustion engine of the type just described wherein the main and auxiliary combustion chambers are supplied, respectively, through main and auxiliary throttled passages having venturis of predetermined size ratio, wherein the effective area of the auxiliary venturi is less than the effective area of the torch nozzle whereby the flow through the torch nozzle is determined by the auxiliary venturi rather than by the torch nozzle, particularly under full load operating conditions so that the desired ratio between the lean and rich air-fuel mixtures may be maintained.

Another object is to provide in an engine of this type, a carburetor for producing the rich air-fuel mixture at the auxiliary venturi and to inject liquid fuel for the lean air-fuel mixture into the air supply passage for the main combustion chamber.

DESCRIPTION OF THE DRAWING

The drawing is a fragmentary view of the head portion of an internal combustion engine and a fragmentary view of a venturi assembly connected by diagrammatical representations of flow passages therebetween.

The internal combustion engine includes an engine body 1 which may be conventional and is capped by an engine head 2 forming therewith one or more main combustion chambers 4. Adjacent each main combustion chamber is a small auxiliary combustion chamber 6 connected to the main combustion chamber 4 by a torch nozzle 7. The main combustion chamber is provided with a main inlet port having a main inlet valve 8. The main combustion chamber is also provided with an exhaust port and valve, not shown. The auxiliary combustion chamber is provided with an inlet port controlled by an auxiliary inlet valve 9 and is provided with a spark plug 10.

The main combustion chamber 4 and auxiliary combustion chamber 6 are supplied respectively, by a main inlet passage 3 and an auxiliary inlet passage 5 indicated diagrammatically by broken lines. These passages are connected, respectively, with a main venturi $16_1$ and an auxiliary venturi $16_2$ having corresponding main and auxiliary throttle valves 12 and 13 which are connected for movement in unison by a linkage 11 indicated diagrammatically by broken lines.

The main inlet passage 3 is provided with a fuel injector nozzle 15, supplied from a fuel injecting apparatus shown diagrammatically at 14.

At one side of the auxiliary venturi $16_1$ is a carburetor 17 having a float chamber 18 for liquid fuel and a fuel nozzle extending into the venturi $16_2$ for entrainment with air passing through the venturi.

Operation of the internal combustion engine is as follows:

The injection nozzle 15 and its fuel injecting apparatus 14 are arranged to deliver liquid fuel into the inlet passage 3 to mix with air and thus provide a lean mixture to the main combustion chamber; whereas, the carburetor 17 and its fuel nozzle 18 are arranged to produce a rich air-fuel mixture for delivery to the auxiliary combustion chamber 6.

It is desirable that the respective volumes of the two mixtures as received in the main and auxiliary combustion chambers be determined by the flow ratio between the main venturi $16_1$ and the auxiliary venturi $16_2$, and the relative effective areas of the main venturi $16_1$ and auxiliary venturi $16_2$ are selected so as to produce the optimum overall ratio between the fuel and air under full load conditions. However, flow through the venturis is determined by the suction pressure produced by a piston descending in the cylinder underlying the main combustion chamber 4. It is, therefore, important that the torch nozzle 7 have a larger effective area than the corresponding auxiliary venturi $16_2$. If the size of the torch port 7 is adequate for full throttle, it is adequate for partial throttle. The proper ratio at less than full throttle is maintained by the relative positions of the throttle valves 12 and 13.

As, during operation of the engine, carbon compounds may accumulate in the torch nozzle, the effective area of the torch nozzle is made sufficiently larger than the area of the auxiliary venturi so as to permit such accumulations without adverse effect on the ratio between the rich and lean mixtures.

Having fully described our invention it is to be understood that we are not to be limited to the details herein set forth, but that our invention is of the full scope of the appended claims.

We claim:

1. An internal combustion piston engine comprising: a relatively large main combustion chamber for receiving a lean air-fuel mixture; a relatively small auxiliary combustion chamber for receiving a rich air-fuel mixture; a torch nozzle connecting the chambers; means for igniting the rich mixture in the auxiliary combustion chamber to project a flame through the torch nozzle into the main combustion chamber; a main inlet passage communicating with the main combustion chamber and including a main venturi and a main throttle valve; an auxiliary inlet passage communicating with the auxiliary combustion chamber and including an auxiliary venturi and an auxiliary throttle valve; inlet valves at the chambers for controlling the inlet passages; the effective area of the auxiliary venturi being smaller than the effective area of the torch nozzle and the auxiliary inlet passage whereby maximum inlet flow through the torch nozzle is determined by the auxiliary venturi.

2. An internal combustion engine as defined in claim 1, wherein: a carburetor supplies fuel at the auxiliary venturi and an injector is disposed adjacent the main chamber inlet valve for injecting liquid fuel into the main inlet passage.

3. An internal combustion engine having a main combustion chamber for receiving a lean air-fuel mixture and an auxiliary combustion chamber for receiving a rich air-fuel mixture and a torch opening connecting the chambers, the improvement comprising in combination: a main inlet passage communicating with the main combustion chamber and including a main venturi and a main throttle valve, an auxiliary inlet passage communicating with the auxiliary combustion chamber and including an auxiliary venturi and an auxiliary throttle valve, means for igniting rich mixture in the auxiliary chamber to project a flame through the torch opening into the main combustion chamber, the effective area of the auxiliary venturi being smaller than the effective area of the torch nozzle and the auxiliary inlet passage whereby maximum flow through the torch nozzle is determined by the auxiliary venturi, and lesser rates of flow in the auxiliary inlet passage are determined by the auxiliary throttle valve, and means coordinating the movement of said throttle valves.

4. An internal combustion piston engine having a main combustion chamber and an auxiliary combustion chamber, the chambers being connected by a torch opening, the improvement comprising, in combination: a main inlet passage for supplying a lean mixture to the main combustion chamber, said main inlet passage including a main venturi and a main throttle valve, an auxiliary inlet passage adapted to supply a rich mixture to the auxiliary combustion chamber, said auxiliary inlet passage having an auxiliary venturi and an auxiliary throttle valve, means for igniting the mixture in the auxiliary chamber to project a flame through the torch opening into the main combustion chamber, the effective area of the auxiliary venturi being smaller than the effective area of the torch opening and the auxiliary inlet passage, whereby maximum flow through the torch opening is determined by the auxiliary venturi, and means coordinating the movement of said throttle valves.

* * * * *